April 17, 1956  G. S. FABER  2,741,976
COFFEE BREWING APPARATUS
Filed March 5, 1952
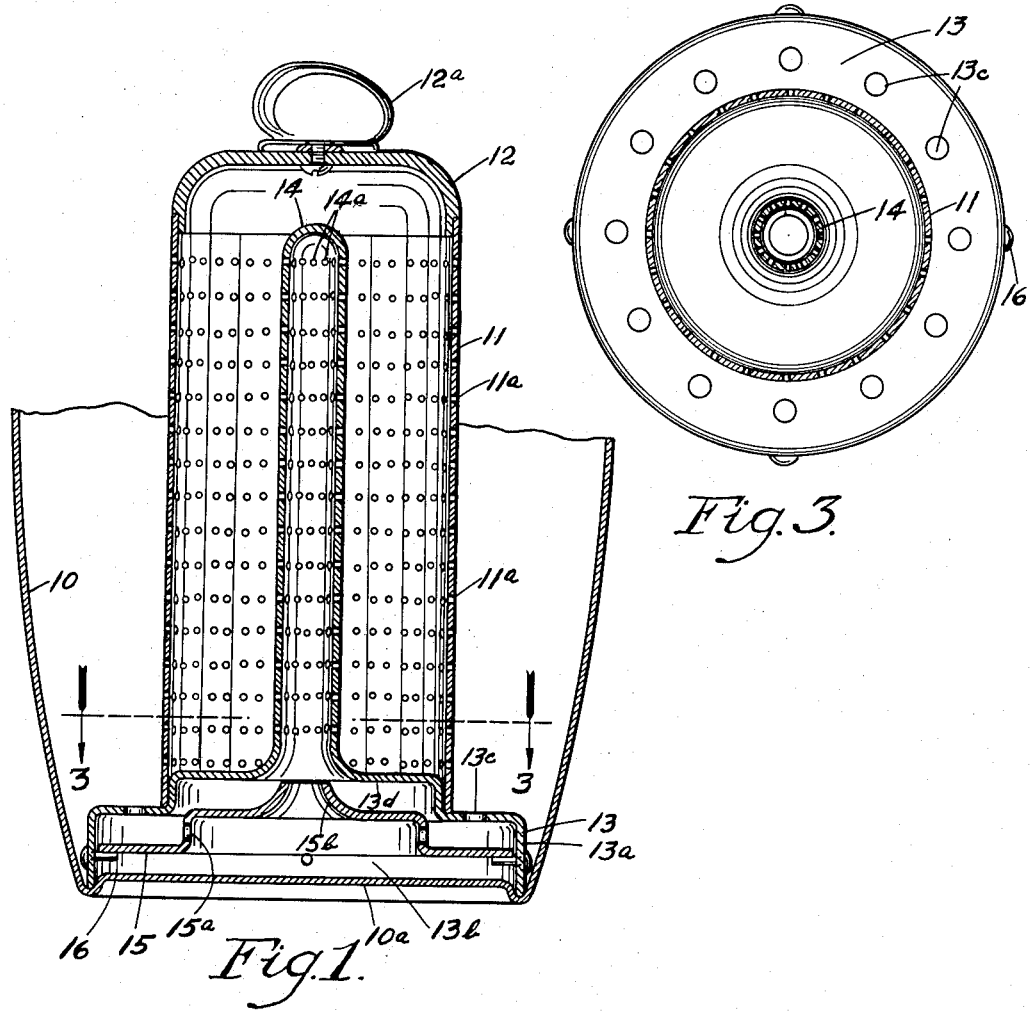
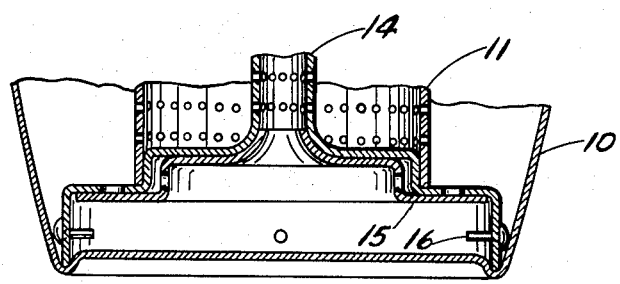
Inventor:
Guy S. Faber,
By Schroeder, Merriam, Hofgren & Brady
Att'ys United States Patent Office 2,741,976
Patented Apr. 17, 1956

2,741,976
COFFEE BREWING APPARATUS
Guy S. Faber, Chicago, Ill.
Application March 5, 1952, Serial No. 274,970
1 Claim. (Cl. 99—308)

This invention relates to coffee brewing apparatus adapted to be immersed in water for cold water or hot water brewing.

The apparatus of this invention is adapted to contain ground coffee and to be usable without change or alteration for ordinary hot water coffee brewing or for the preferred cold water brewing or steeping. In either case the apparatus with the ground coffee therein is immersed in the water. The apparatus is provided with an automatically operating valve means that is operable only during hot water brewing to heat successive portions of water and then direct these heated portions successively into the ground coffee. During the cold water brewing the coffee maker with the ground coffee therein is immersed in the cold water for approximately 12 hours after which it is removed and the extract heated for serving.

One of the features of this invention is to provide a coffee brewing apparatus of the above type comprising a foraminous holder for ground coffee and valve means associated therewith inoperative in cold water but automatically operative in hot water to force heated water through the ground coffee in the holder. A more specific feature of the invention is to provide such an apparatus comprising the foraminous holder, a base on the bottom of the holder having a hollow chamber provided with water ports, a foraminous hollow column within the holder and communicating with the chamber, a transverse valve plate in the chamber having an opening aligned with the entry to the column and water ports out of alignment with the base water ports, this valve plate being normally spaced from the top of the chamber when in cold water to permit water flow through all of the ports but being oscillatable toward and away from the top by the kinetic energy of hot water to close and open alternately the ports, and means for limiting the downward movement of the valve plate to a position above the bottom of the chamber so that water flowing through the ports when the valve is open will flow at least partially to the chamber portion beneath the valve plate. Other features and advantages of the invention will be apparent from the following description of one embodiment of the invention taken in conjunction with the accompanying drawings. Of the drawings:

Figure 1 is a fragmentary vertical section through one embodiment of the apparatus of this invention in position in a water container and showing the valve in its lowermost position.

Figure 2 is a fragmentary section similar to the bottom portion of Figure 1 but showing the valve in raised position.

Figure 3 is a sectional view taken substantially along line 3—3 of Figure 1.

The coffee brewing apparatus of this invention comprises a foraminous holder for ground coffee adapted to be immersed in water for cold water or hot water brewing. This container has associated therewith a base which is adapted to rest on the bottom of the water container with this base having water ports therein so that water may flow into a chamber beneath the ground coffee. The base also contains a valve which normally rests in inoperative position when cold water is used in the brewing but which is automatically operated during heating of the water for hot water brewing to open and close the water ports alternately in order that successive portions of water will be first drawn into the chamber in the base for heating and then expelled upwardly through the ground coffee. In order that the heated portion will be forced up through the ground coffee the valve is automatically closed preferably by the kinetic energy of the heated portion of water in order that none of this energy will be dissipated out through the water ports.

The coffee brewing apparatus of this invention produces excellent coffee extract whether hot water or cold water methods are used. The apparatus has many advantages over prior types of coffee brewing apparatus such as percolators, drip pots, vacuum systems, boilers and the like. Thus with the apparatus of this invention no upper container is required as is true with the percolators, vacuum coffee makers, and drip coffee makers. Furthermore, the apparatus may be used without change and without alteration in an ordinary water container for either hot water or cold water coffee making and the conversion of the apparatus from one to the other is purely automatic. The apparatus may be used with any vessel, pan, or pot in which water can be held and, where desired, heated. The valve structure of the apparatus automatically positions itself for most efficient operation of the coffee brewing apparatus.

The ports in the base of the apparatus and in the valve are so positioned that maximum efficiency is obtained where cold water is diffused through the ground coffee in cold water steeping. These ports are so arranged so that when hot water methods are used the valve will operate with relatively low temperature water to force this water through the grounds. As is well known, excessively hot water should not be used in coffee brewing as it tends to extract the bitter constituents of the coffee bean and the rancid oils. The structure of this invention, therefore, is designed to operate under hot water making conditions at a relatively low temperature.

As the apparatus is designed to be immersed in the water, it may be used with equal efficiency to make any amount of coffee extract by either the hot or cold water methods. This, of course, is not true of the ordinary coffee makers as they are designed for maximum efficiency when the particular maker is operated at approximately full capacity. Furthermore, as the apparatus is used immersed in water, the aromatic oils and other relatively volatile constituents of the coffee bean are not driven off as is true of many of the ordinary coffee makers.

The coffee brewing apparatus shown in the accompanying drawings is adapted to be held in any ordinary container such as the metal pot 10. The apparatus shown comprises a foraminous substantially cylindrical holder 11 containing a plurality of perforations 11a. This holder is preferably provided with a removable cap 12 having a handle portion 12a thereon. On removal of the cap 12 the ground coffee is introduced into the holder 11.

The bottom of the holder 11 is provided with a base 13 having a downwardly extending flange 13a defining an internal chamber 13b. The portion of the base 13 beyond the holder 11 is provided with a circularly arranged series of water ports 13c. The portion of the base 13d that extends across the bottom of the holder 11 merges with an upwardly extending column 14 located centrally of the holder and extending to a point adjacent the top thereof. This column is also provided with a series of holes 14a so that it also is foraminous. The bottom of this column is gently curved outwardly to blend smoothly with the portion 13d of the base 13.

Extending across the interior of the base 13 is a transverse valve plate 15. This plate is also provided with a series of water ports 15a and is normally held approximately midway between the top and bottom of the chamber 13b by a series of horizontally arranged inwardly extending pins 16. The central portion 15b of the valve plate is provided with an opening and is smoothly curved upwardly with approximately the same curvature as the bottom of the column 14 so that it will lie along the bottom surface of the entrance to the column when the valve is in raised position as shown in Figure 2.

During ordinary cold water brewing or steeping the holder 11 is filled to the desired level with coffee grounds and the apparatus placed in a pot 10 containing the required amount of cold water. The ground coffee is permitted to stand for approximately 12 hours. At the end of this time the apparatus may be removed entirely and the extract heated for serving. During this cold water operation the valve 15 remains in inoperable position as shown in Figure 1. During the cold water preparation the water diffuses in and through the ground coffee held in the annular space between the holder 11 and the column 14 by passing through the perforations or holes 11a and 14a. Water also passes through the water ports 13c into the chamber 13b and upwardly into the column 14 and also passes through the ports 13c and 15a upwardly through the central opening in the valve plate 15. This diffusion is caused by the natural convection current due to temperature changes in a body of liquid and by similar internal activity.

When the apparatus is to be used for hot water brewing the ground coffee is again placed within the holder 11 and the cap 12 placed in position. This cap may have a screw thread connection to the holder 11 if desired. After the holder has been placed in the pot in the position shown in Figure 1, heat is applied to the bottom 10a of the pot. This heats water within the chamber 13b. As soon as water in this chamber has reached a relatively low temperature the kinetic heat energy of the water due to the upward currents thereof raises the valve plate 15 to the position shown in Figure 2 thus effectively closing the water ports 13c and 15a. Water, of course, flows through these ports into the chamber 13b while the valve is moving upwardly. However, as soon as these ports have been closed, the heated water is forced upwardly through the opening defined by the portion 15b into the bottom of the column 14 and out through the ground coffee in the holder 11. As soon as the energy of this heated water portion has been thus dissipated the valve plate 15 falls to the position shown in Figure 1 thereby causing more water to flow through the ports 13c and 15a into the chamber 13b where the action is repeated. Thus during the hot water brewing the valve 15 alternately raises and falls to permit successive portions of water to be drawn into the chamber 13b, heated and forced upwardly into the column 14 and through the ground coffee.

In hot water brewing, the kinetic energy of the heated water in the chamber 13b causes the pumping-valve means or plate 15 to move forcefully upwardly. This upward movement of the plate 15 forces a substantial portion of the water that is between the plate 15 and the base 13 up into the column 14 and then laterally into and through the container 11. Although some water during this movement will escape through the ports 13c and 15a, this escape will be minor because of the small areas of these ports. Similarly, some water will escape downwardly through the opening defined by the central portion 15b of the plate 15. However, as the entrance into the column 14 has an internal diameter considerably larger than the minimum internal diameter of the opening formed by the central portion 15b, a large portion of the water above the plate 15 will be directed into this column 14. Because the plate 15 is of relatively large area, a large mass of water is held between this plate 15 and the base 13.

As soon as the plate 15 has been raised by this kinetic energy into contact with the base 13, the water beneath the plate 15 will then be ejected through the opening formed by the central portion 15b into the interior of the column 14 by the kinetic energy of this water. As soon as this action has been accomplished, the plate 15 then falls from the position shown in Figure 2 to the initial position shown in Figure 1 so that more water can enter beneath the plate 15 through the ports 13c and 15a and to the space above the plate through the port 13c where the described action will be repeated.

Because the holder 11 is immersed in the water, the temperature of the hot water may be kept relatively low so that all the volatile constituents of the coffee bean may be retained. Furthermore as efficient heat transfer and fluid flow is obtained, the coffee is brewed to the proper strength in a very short time. The inner column 14 is preferably of relatively small transverse diameter so that the portions of hot water forced therein will be propelled with considerable force laterally through the ground coffee. This hot water exploding into the inner column causes surges in the water around the holder 11 so that the water is constantly flowing back and forth through the grounds. This also increases the efficiency of the hot water brewing. By keeping the chamber 13b in which the water is heated relatively thin, the water is quickly heated to the desired temperature and this temperature may be kept low in order that the volatile constituents will not be driven off. By providing such a well defined water heating chamber 13b the apparatus is easily designed to give maximum efficiency at the desired low temperatures.

In the embodiment shown in the drawings the bottom of the chamber 13b is formed by the bottom 10a of the pot 10. Thus the bottom of the pot cooperates with the flange 13a to form a well defined chamber and this chamber is exposed on removing the apparatus so that it may be easily cleaned. As is shown in the drawings the bottom 10a is preferably raised somewhat so as to concentrate the heat in this area.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

Coffee brewing apparatus adapted to be immersed in water for cold water and hot water brewing, comprising: a foraminous water immersible holder for ground coffee; a base on the bottom of the holder having a hollow chamber immediately beneath the holder and provided with water ports; a foraminous hollow column extending upwardly within the holder and communicating for substantially the full length thereof with the chamber, the column having a closed upper end and being perforated for substantially its entire length; a transverse pumping-valve plate in the chamber of relatively large area having an opening aligned with the entry to the column and water ports out of alignment with the base water ports, said plate being normally spaced from the top of the chamber when in cold water to maintain the ports open and permit water flow through all said ports but being oscillatable toward and away from said top by the kinetic energy of hot water to close and open alternately said ports; and means for limiting the downward movement of the plate to a position above the bottom of the chamber so that water flowing through the ports when the pumping-valve is open will flow at least partially to the chamber portion beneath the valve plate.

(References on following page)

References Cited in the file of this patent

UNITED STATES PATENTS

| | | |
|---|---|---|
| 97,077 | Gilroy | Nov. 23, 1869 |
| 544,963 | Cummings | Aug. 20, 1895 |
| 770,426 | Frank | Sept. 20, 1904 |
| 1,047,402 | Gefter | Dec. 17, 1912 |
| 1,122,298 | Nelson | Dec. 29, 1914 |
| 1,167,775 | Miller | Jan. 11, 1916 |
| 1,445,788 | Millican | Feb. 20, 1923 |
| 1,573,668 | Wood | Feb. 16, 1926 |
| 1,579,636 | Borgnis | Apr. 6, 1926 |
| 1,588,769 | Parker | June 15, 1926 |
| 1,680,571 | Routsos | Aug. 14, 1928 |
| 2,213,723 | Smith | Sept. 3, 1940 |

FOREIGN PATENTS

| | | |
|---|---|---|
| 8,074 | Great Britain | Mar. 12, 1892 |
| 12,077 | Great Britain | 1891 |